United States Patent [19]

Ueda et al.

[11] 4,025,460

[45] May 24, 1977

[54] CATALYST FOR GASIFICATION OF HEAVY HYDROCARBONS IN FLUIDIZED BED

[75] Inventors: Mikio Ueda, Takatsuki; Takeshi Kubota, Yachiyo; Yasuo Nishikawa, Okayama; Akira Watanabe, Shinogoze, all of Japan

[73] Assignees: Kyushu Taika Renga Kabushiki Kaisha; Mitsui Shipbuilding and Engineering Co., Ltd., Japan

[22] Filed: June 4, 1975

[21] Appl. No.: 583,580

[52] U.S. Cl. .................................. 252/457; 252/473
[51] Int. Cl.² ..................... B01J 29/00; B01J 23/58
[58] Field of Search ............. 252/457, 473; 48/212, 48/214 A

[56] References Cited

UNITED STATES PATENTS

| | | |
|---|---|---|
| 2,472,834 | 6/1949 | Schexnailder, Jr. et al. ... 252/457 X |
| 2,958,647 | 11/1960 | Hirschler ........................ 252/457 X |
| 3,033,648 | 5/1962 | VanderLinden ................ 252/457 X |
| 3,100,234 | 8/1963 | Lee .................................. 252/473 X |
| 3,726,966 | 4/1973 | Johnson .......................... 252/473 X |

*Primary Examiner*—Carl F. Dees
*Attorney, Agent, or Firm*—Ostrolenk, Faber, Gerb & Soffen

[57] ABSTRACT

A catalyst for the gasification of heavy hydrocarbons in a fluidized bed which contains CaO and has high catalytic activity, long life and mechanical strength, and further characterized in that a part or the whole of said CaO exists in the form of at least one member selected from the group consisting of $2CaO \cdot Fe_2O_3$, $2CaO \cdot SiO_2$ and $3CaO \cdot SiO_2$ is disclosed.

4 Claims, 1 Drawing Figure

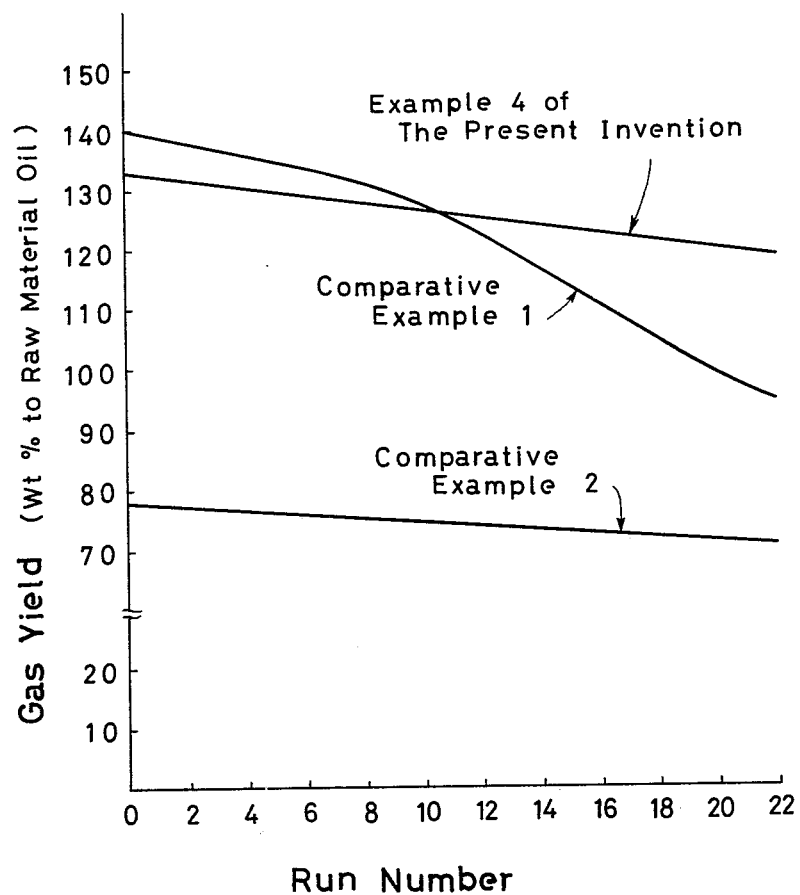

CATALYST FOR GASIFICATION OF HEAVY HYDROCARBONS IN FLUIDIZED BED

BACKGROUND OF THE INVENTION

This invention relates to a catalyst for the gasification of heavy hydrocarbons. More particularly, the invention relates to a catalyst which is used for the catalytic gasification of relatively heavy hydrocarbons in a fluidized catalytic bed.

It is well known in the conventional art that relatively heavy hydrocarbons such as the residual oils of atmospheric distillation or reduced pressure distillation are subjected to catalytic cracking in a fluidized bed to produce fuel gas, town gas and raw material gas for industrial purposes.

The catalyst particles for such fluidized bed are brought into contact with reactants (raw oils) in a fluidized state, so that the necessary properties for the fluidized bed catalyst are somewhat different from those of the catalyst for fixed bed operation.

For instance, the fixed bed catalyst must have the properties of (1) high catalytic activity (high efficiency in water gas shift reaction), (2) good selectivity, (3) large mechanical strength, and (4) long catalytic life.

Needless to say, the catalyst particles for the fluidized bed must also have the above-mentioned properties, it is still necessary to have some specific properties in addition to the above.

That is, the particles of fluidized bed catalyst should be resistant to wear because they collide repeatedly with each other and with the interior wall of reaction tube in a fluidized state.

Further, in order to maintain the fluidized state successfully, the catalyst particles should have a proper particle size distribution and each particle may be almost spherical.

In some instances, heavy hydrocarbon oil was subjected to catalytic cracking in fluidized beds to produce gas, however, there has never been reported the catalyst which satisfies the above-mentioned requirements.

It is well known that calcium oxide (CaO) has catalytic activity for the water gas reaction of heavy hydrocarbons. The purpose in using free calcium oxide particles resides in the fixation of sulfur vanadium, sodium and the like contained in the raw oil, as well as in the utility of the catalytic activity for water gas reaction. When the calcium oxide particles are used as catalyst, however, the following disadvantage is occur.

Calcium oxide particles absorb $H_2O$ and $CO_2$ and decaying particles, the so-called slaking, takes place. Calcium oxide is usually obtained by calcining limestone or dolomite at a temperature above 900° C and is generally used in the form of powdery particles. However, when these calcium oxide particles are used for fluidized bed operation, the smooth flow of the particles can not be expected since the particle size distribution of such calcium oxide is not covered within a certain range.

Furthermore, owing to the lack of wear resistance and to the above-mentioned disintegration by slaking, the calcium oxide particles are liable to become fine powder. The produced powder is caused to fly off or it forms secondary agglomerates which prevents the catalyst particles from smooth flowing in the reaction tube.

Still further, as disclosed in the above, calcium oxide fixes sulfur and heavy metals such as nickel and vanadium contained in the raw material oil, and this fact means that the calcium oxide catalyst is poisoned by sulfur and heavy meals. Thus the catalytic activity is decreased and the catalytic life becomes short, which have been serious problems in the conventional art.

BRIEF SUMMARY OF THE INVENTION

It is therefore a general object of the present invention to provide an improved catalyst which is free from the above-mentioned disadvantages caused in the conventional catalysts.

It is another object of the present invention to provide a catalyst which has good selectivity and a long catalytic life.

It is a further object of the present invention to provide a catalyst which has excellent mechanical strength and is hardly disintegrated in a fluidized condition.

Pursuant to the above objects, the catalyst of the present invention for the gasification of heavy hydrocarbons in a fluidized bed is characterized in that a part or the whole of calcium oxide (CaO) component in the catalyst comprises at least one member selected from the group consisting of $2CaO \cdot Fe_2O_3$, $2CaO \cdot SiO_2$ and $3CaO \cdot SiO_2$.

BRIEF DESCRIPTION OF THE DRAWINGS

These and other objects and features of the present invention will become more apparent from the following detailed description and examples taken in connection with the accompanying drawings in which the drawing is a graphical representation of gas yields versus run numbers in the processes using the catalysts of Example 4 of the present invention and Comparative Examples 1 and 2.

DETAILED DESCRIPTION OF THE INVENTION

As briefly disclosed in the above, the present invention provides a novel and improved catalyst which is useful for the gasification of heavy hydrocarbons by catalytic cracking in a fluidized bed. This catalyst is characterized in that a part or the whole of the CaO contained in the catalyst comprises one or more members selected from the group consisting of $2CaO \cdot Fe_2O_3$, $2CaO \cdot SiO_2$ and $3CaO \cdot SiO_2$. As the catalyst component of the present invention, if necessary, MgO can be incorporated in addition to the above components of $2CaO \cdot Fe_2O_3$, $2CaO \cdot SiO_2$ and $3CaO \cdot SiO_2$. When MgO is added to the catalyst composition, the thermal resistance and wear resistance of the catalyst may be improved, however, the amount of addition should be less than 70% by weight of the catalyst. When more than 70% of MgO is added to the catalyst, the catalytic action of CaO (water gas shifting action for heavy hydrocarbons) is impaired to some extent which is not desirable.

When the CaO component in the catalyst exists in the form of $2CaO \cdot SiO_2$ or $3CaO \cdot SiO_2$ most of CaO is preferably in that form. When the CaO in the catalyst is $2CaO \cdot Fe_2O_3$, some portion of CaO may be in the form of $2CaO \cdot Fe_2O_3$ and the remainder CaO may be free CaO because the surfaces of CaO particles are coated by $2CaO \cdot Fe_2O_3$ giving the same effect as that of $2CaO \cdot Fe_2O_3$ itself. Further a small amount of free $Fe_2O_3$ constitutes no obstacle.

The reason why CaO is contained in the form of $2CaO \cdot SiO_2$, $3CaO \cdot SiO_2$ or $2CaO \cdot Fe_2O_3$ will be explained in the following.

Any of the above-mentioned materials $2CaO \cdot Fe_2O_3$ $2CaO \cdot SiO_2$ and $3CaO \cdot SiO_2$ have relatively large wear resistance as compared with CaO. In addition, these compounds are chemically stable and are not disintegrated in the presence of $CO_2$ and $H_2O$ which is different from CaO. Further, the lowering of activity by poisoning caused by the absorption of sulfur, nickel, vanadium and the like is also small as compared with that of CaO.

The method for preparing the catalyst of the present invention will now be explained. CaO powder of less than 20 microns in particle size is mixed with $Fe_2O_3$ material or $SiO_2$ material to obtain a mixture of a predetermined formula, and this composition is well mixed in a mixer and then kneaded with the addition of a proper quantity of water. This kneaded material is then extruded through a vacuum extruder and further granulated by using a granulating machine. Instead of the above kneading, the raw materials can be mixed in the state of slurry. This slurry can be then granulated by using a spray drier. Further in place of the above process, the particulate or granular material can be prepared by grinding previously synthesized $2CaO \cdot Fe_2O_3$, $2CaO \cdot SiO_2$ or $3CaO \cdot SiO_2$ and granulating the thus obtained powder by using a granulating machine or spray drier.

The granular material obtained in one of the above process is then placed in an appropriate receptable and calcined at a temperature above 1000° C, preferably above 1100° C, to obtain the catalyst. When the calcining temperature is below 1000° C, the mineral textures of $2CaO \cdot Fe_2O_3$, $2CaO \cdot SiO_2$ and $3CaO \cdot SiO_2$ are hardly formed, so that it is not desirable.

As the material for CaO component, calcium carbonate, slaked lime, quick lime and dolomite can be advantageously used and as $Fe_2O_3$ material, oxides or hydroxides of iron such as hematite, magnetite and limonite are used. Further as the source of $SiO_2$, quartzite, serpentine, wollastonite and peridotite are suitably used. When the above-mentioned dolomite, serpentine and peridotite are used as the raw material, the MgO component may be naturally introduced into the catalyst composition, however, magnesia clinker (magnesium oxide), magnesium hydroxide and magnesite (magnesium carbonate) can be used as other MgO sources.

The characteristic features and advantages of the catalyst of the present invention are as follows:

1. The life of the present catalyst is long enough since the catalytic poisoning by nickel, vanadium and sulfur is little as compared with that of the conventional CaO particles, which comes from the fact that CaO exists in the form of $2CaO \cdot Fe_2O_3$, $2CaO \cdot SiO_2$ or $3CaO \cdot SiO_2$. 2. For the same reason as the above, the present catalyst is chemically stable and large in wear resistance, therefore the loss by disintegration or wearing off and the blocking of flow by the agglomerated powder can be prevented. 3. The catalyst is chemically stable as compared with CaO particles, so that it can be formed into desired spherical granules having a predetermined particle size distribution. Accordingly, the flowing condition of catalyst particles in the reaction tube can be made smooth.

Since the catalyst of the present invention has the above features, a long and stable operation can be carried out by using the catalyst for the fluidized bed gasification of heavy hydrocarbon oil.

The features and advantages of the catalyst of the present invention will be further explained in the following by way of example.

EXAMPLE 1

Limestone was subjected to primary crushing and then to secondary crushing and it was further ground by wet process to obtain powder of less than 20 microns in particle size. The thus obtained limestone powder was mixed with hematite powder where the ratio of $CaO:Fe_2O_3$ was about 80:20.

This composition was mixed well in a mixer and it was then kneaded with water. Then the kneaded material was extruded from a nozzle of 0.8 mm diameter by using a vacuum extruder. The extruded material was further treated by a granulating machine (Trademark: Marumerizer) to obtain spherical granules of about 1 mm in particle diameter. This granular materials were then baked in an MgO-made saggar at 1350° C for 2 hours and baked spherical granules of about 0.5 mm in diameter were obtained.

The chemical composition and physical properties of these spherical granules are shown in the following Table 1 and 2. The main mineral components of the granules were $2CaO \cdot Fe_2O_3$ and CaO according to the result of X-ray diffraction method.

Table 1

| | Chemical Composition (wt %) | | | | | |
|---|---|---|---|---|---|---|
| CaO | MgO | $SiO_2$ | $Fe_2O_3$ | $Al_2O_3$ | | Ignition Loss |
| 77.6 | 1.1 | 0.9 | 19.3 | 0.6 | | 0.5 |

Table 2

| | Physical Properties | |
|---|---|---|
| Apparent Porosity | Specific Gravity (Bulk) | Angle of Repose |
| 5.9% | 2.7 | 36° |

EXAMPLE 2

Dolomite ore of Kuzuu, Tochigi-ken, Japan was subjected to primary crushing and secondary crushing. The crushed one was mixed with fine powder of limonite where the ratio of $CaO:Fe_2O_3$ was about 75:25 and this mixture was further subjected to wet grinding to produce fine powder of less than 20 microns in particle size.

The slurry obtained in the above wet grinding was formed into granular material of 200 microns in average particle size through the granulation by using a spray drier.

This granular material was then baked in an MgO-made saggar at 1350° C for 2 hours. The average particle size of this baked granules was 100 microns. According to the result of X-ray diffraction analysis, the main mineral components were $2CaO \cdot Fe_2O_3$, CaO and MgO. The chemical composition and physical properties of the thus obtained granular material are shown in the following Tables 3 and 4.

Table 3

| Chemical Composition (wt %) | | | | | | | Ignition Loss |
|---|---|---|---|---|---|---|---|
| CaO | MgO | $SiO_2$ | $Fe_2O_3$ | $Al_2O_3$ | $TiO_2$ | $Na_2O$ | |
| 51.5 | 26.8 | 1.8 | 17.5 | 0.72 | 0.8 | 0.2 | 0.7 |

Table 4

| Apparent Porosity | Physical Properties Specific Gravity (Bulk) | Angle of Repose |
|---|---|---|
| 5.5% | 2.8 | 31° |

EXAMPLE 3

The ratio of $CaO:Fe_2O_3$ was made 2:1 by mixing limestone powder with magnetite powder and the mixture was then formed into granules with proper particle size. The granules were then baked at 1350° C for 2 hours. The main mineral component of the baked granules was $2CaO \cdot Fe_2O_3$.

After the primary and secondary crushing of the baked granules, the crushed material was subjected to wet grinding to obtain a slurry of fine particles of less than 20 microns in particle size.

This slurry was then granulated and dried by using a spray drier and granules of 250 microns in average particle size were formed.

This granular material was baked again in an MgO-made saggar at 1300° C for 2 hours.

The chemical composition and physical properties of the thus obtained granular material are shown in the following Tables 5 and 6.

Table 5

| Chemical Composition (wt %) | | | | | |
|---|---|---|---|---|---|
| CaO | MgO | $SiO_2$ | $Fe_2O_3$ | $Al_2O_3$ | Ignition Loss |
| 64.5 | 1.0 | 0.7 | 32.6 | 0.7 | 0.5 |

Table 6

| Apparent Porosity | Physical Properties Specific Gravity (Bulk) | Angle of Repose |
|---|---|---|
| 4.8% | 3.1 | 30° |

EXAMPLE 4

After the primary and secondary crushing of limestone, the crushed material was subjected to wet grinding to obtain powder of less than 20 microns in particle size. This powdered limestone was then mixed with fine powder of serpentine so as to form a composition of about 70:30 in the ratio of $CaO:SiO_2$.

The powder composition was then mixed well with a mixer and kneaded with proper amount of water. Further, the kneaded material was extruded through a nozzle of 0.8 mm in diameter by using a vacuum extruder. The extruded material was formed into spherical granules of about 1 mm in diameter by using a granulating machine (Marumerizer). The thus obtained granular material was baked in an MgO-made saggar at 1500° C for 2 hours and baked granules of about 0.5 mm in diameter were obtained.

The chemical composition and physical properties of the baked material are shown in the following Tables 7 and 8.

Table 7

| Chemical Composition (wt %) | | | | | |
|---|---|---|---|---|---|
| CaO | MgO | $SiO_2$ | $Fe_2O_3$ | $Al_2O_3$ | Ignition Loss |
| 49.8 | 22.6 | 21.3 | 3.0 | 2.9 | 0.4 |

Table 8

| Apparent Porosity | Physical Property Specific Gravity (Bulk) | Angle of Repose |
|---|---|---|
| 12.5 | 2.81 | 35° |

EXAMPLE 5

After the primary and secondary crushing of the dolomite produced in Kuzuu, Tochigi-ken, Japan, the crushed material was mixed with fine powder of $SiO_2$ so as to obtain a mixture of about 2:1 in the ratio of $CaO:SiO_2$. This mixture was then subjected to wet grinding and reduced to powder of less than 20 microns in particle size.

The slurry of the above powder was granulated and dried by using a spray drier to obtain granular material of 200 microns in average particle size which was baked at 1600° C for 3 hours. The average particle size of the thus baked material was 100 microns and the main mineral components thereof according to X-ray diffraction were $3CaO \cdot SiO_2$ and MgO.

The chemical composition and physical properties of the above granular material are shown in the following Table 9 and 10.

Table 9

| Chemical Composition (wt %) | | | | | |
|---|---|---|---|---|---|
| CaO | MgO | $SiO_2$ | $Fe_2O_3$ | $Al_2O_3$ | Ignition Loss |
| 48.8 | 25.6 | 24.4 | 0.3 | 0.3 | 0.6 |

Table 10

| Apparent Porosity | Physical Properties Specific Gravity (Bulk) | Angle of Repose |
|---|---|---|
| 12.5% | 2.81 | 35° |

EXAMPLE 6

Fine powders of limestone and quartzite were mixed together to produce a mixture having the ratio of $CaO:SiO_2$ of 2:1 and the mixture was formed into granules of a proper size. This granular material was baked at 1550° C for 3 hours. The main mineral component of this baked material was $3CaO \cdot SiO_2$. This baked material was then subjected to primary crushing, secondary crushing and wet grinding to form a slurry of particles having particle size of less than 20 microns.

The slurry was granulated and dried by using a spray drier to form granular material of 250 microns in average particle size. This granular material was then baked in an MgO-made saggar at 1550° C for 3 hours.

The chemical composition and physical properties of thus obtained baked material are shown in the following Table 11 and 12.

Table 11

| Chemical Composition (wt %) | | | | | |
|---|---|---|---|---|---|
| CaO | MgO | $SiO_2$ | $Fe_2O_3$ | $Al_2O_3$ | Ignition Loss |
| 65.2 | 0.9 | 32.5 | 0.5 | 0.4 | 0.5 |

Table 12

| Apparent Porosity | Physical Properties Specific Gravity (Bulk) | Angle of Repose |
|---|---|---|
| 21.6% | 2.64 | 31° |

COMPARATIVE EXAMPLE 1

Dolomite produced in Kuzuu, Tochigi-ken, Japan was baked at about 900° C and ground into powder of less than 200 microns in particle size. The chemical composition of the dolomite was determined and is shown in the following Table 13.

Table 13

| | Chemical Composition (wt %) | | | | |
|---|---|---|---|---|---|
| CaO | MgO | $SiO_2$ | $Fe_2O_3$ | $Al_2O_3$ | Ignition Loss |
| 34.40 | 18.75 | 0.24 | 0.32 | 0.12 | 46.20 |

COMPARATIVE EXAMPLE 2

Foundry sand having particle size of less than 200 microns was prepared and used as a comparative sample. The chemical composition of this sand is shown in the following Table 14.

Table 14

| | Chemical Composition (wt %) | | | | |
|---|---|---|---|---|---|
| $SiO_2$ | $Al_2O_3$ | $Fe_2O_3$ | CaO | MgO | Ignition Loss |
| 98.32 | 0.15 | 0.77 | 0.05 | 0.05 | 0.41 |

The residual oil or reduced pressure distillation as indicated in the following Table 15 was used as the raw material for the comparative test.

Table 15

| Chemical Composition of Residual Oil (wt %) | | | | |
|---|---|---|---|---|
| Main Elements | | | Conradson Carbon Residue | Asphaltene |
| C | H | S | | |
| 84.6 | 11.1 | 3.4 | 21.4 | 8.3 |

A stainless steel fluidized bed reactor (4B × 1200 mm) with forced external heating was fed with 2.5 liters of catalyst particles and gasification was carried out, the reaction conditions and results of which are shown in the following Table 16.

Table 16

| Example Number | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Reaction Conditions | | | | | | | | |
| Temperature (° C) | 900 | 900 | 900 | 900 | 900 | 900 | 900 | 900 |
| Pressure | atmos | atmos | atmos | atmos | atmos | atmos | atmos | atmos |
| S/C (mol/mol) | 1.4 | 4.4 | 2.1 | 1.8 | 2.0 | 2.0 | 2.4 | 2.0 |
| Contact Time (sec) | 1.2 | 1.25 | 1.1 | 1.1 | 1.1 | 1.1 | 2.0 | 1.1 |
| Gas Yield (Wt % to raw material oil) | 143.2 | 137.4 | 124.5 | 131.5 | 123.6 | 120.3 | 140.0 | 74.5 |
| Results of Analyses | | | | | | | | |
| CO (Vol %) | 20.0 | 12.5 | 11.4 | 11.4 | 10.9 | 10.8 | 18.4 | 6.2 |
| $CO_2$ | 12.0 | 14.9 | 14.4 | 14.4 | 13.0 | 13.1 | 12.0 | 7.9 |
| $H_2$ | 47.9 | 59.3 | 55.7 | 55.7 | 41.9 | 51.0 | 49.9 | 41.2 |
| $CH_4$ | 12.4 | 7.8 | 8.9 | 8.9 | 10.6 | 14.1 | 12.4 | 23.4 |
| $C_2$ | 7.7 | 5.3 | 9.0 | 9.0 | 13.1 | 9.3 | 6.9 | 18.3 |
| $C_3+$ | — | — | — | 0.1 | 0.8 | 0.5 | 0.4 | 1.8 |
| $H_2S$ | — | 0.3 | 0.5 | 0.5 | 0.6 | 1.2 | — | 1.2 |
| Remaining Ratio after 10 hours' Operation (%) | 98 | 97 | 98.5 | Ca.97 | ca.97 | ca.97 | ca.53 | ca.92 |
| Catalytic Life | Not changed | Not changed | Not changed | Scarcely changed | Scarcely changed | Scarcely changed | Gas yield decreased after 7 to 8 recycles | Scarcely changed |

According to the numerical data in the foregoing Table 16, the activity (gas yield) in the initial stage of Comparative Example 1 was good as compared with Examples 2 to 6 of the present invention, however as shown in the accompanying drawing, the activity of the catalyst in Comparative Example 1 decreases after of 7 to 8 times usage because it is poisoned by vanadium and nickel.

Further, as understood from the above table, the catalyst of the present invention suffers hardly from the loss by disintegration and flying off (the remaining ratios after 10 hours' operation are large), the yield of gas is relatively good and the catalytic activity is not lowered, therefore excellent and stable operation can be expected by using the catalyst of the present invention.

It should be emphasized, however, that the specific examples described and shown herein are intended as merely illustrative and in no way restrictive of the invention.

What is claimed is:

1. A catalyst for the gasification of heavy hydrocarbons in a fluidized bed which contains CaO and is characterized in that a part or the whole of said CaO exists in the form of at least one member selected from the group consisting of $2CaO \cdot Fe_2O_3$, $2CaO \cdot SiO_2$ and $3CaO \cdot SiO_2$.

2. A catalyst for the gasification of heavy hydrocarbons in a fluidized bed as claimed in claim 1, in which most of CaO component is at least one of $2CaO \cdot SiO_2$ and $3CaO \cdot SiO_2$.

3. A catalyst for the gasification of heavy hydrocarbons in a fluidized bed as claimed in claim 1, in which a part of CaO component is $2CaO \cdot Fe_2O_3$ and the remainder CaO content is free CaO.

4. A catalyst for the gasification of heavy hydrocarbons in a fluidized bed as claimed in claim 1, to which less than 70% by weight of MgO is added.

* * * * *